United States Patent
Chloupek et al.

(10) Patent No.: US 6,548,973 B1
(45) Date of Patent: *Apr. 15, 2003

(54) METHOD AND APPARATUS FOR BRAKING A POLYPHASE DC MOTOR

(75) Inventors: James E. Chloupek, Plano, TX (US); Edward N. Jeffrey, Garland, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,399

(22) Filed: Jan. 8, 1998

Related U.S. Application Data

(60) Provisional application No. 60/033,760, filed on Jan. 15, 1997.

(51) Int. Cl.[7] ................................................ H02P 3/14
(52) U.S. Cl. ....................................................... 318/375
(58) Field of Search .................................. 318/375, 376, 318/466–470; 360/73.03, 74.1, 74.4, 74.6

(56) References Cited

U.S. PATENT DOCUMENTS

| | | | | |
|---|---|---|---|---|
| 3,893,695 A | * | 7/1975 | Rickert | 187/293 |
| 3,975,668 A | * | 8/1976 | Davie | 318/762 |
| 4,417,288 A | * | 11/1983 | Hattori et al. | 360/74.1 |
| 4,494,058 A | * | 1/1985 | Berti | 318/372 |
| 4,658,308 A | | 4/1987 | Sander, Jr. | 360/74.1 |
| 4,683,412 A | * | 7/1987 | Bialek et al. | 318/798 |
| 4,786,995 A | | 11/1988 | Stupeck et al. | 360/75 |
| 4,807,062 A | | 2/1989 | Onodera | 360/75 |
| 4,815,063 A | * | 3/1989 | Aoshima et al. | 369/50 |
| 4,831,469 A | * | 5/1989 | Hanson et al. | 360/75 |
| 4,866,554 A | * | 9/1989 | Stupeck et al. | 360/105 |
| 5,091,680 A | * | 2/1992 | Palm | 318/368 |
| 5,495,156 A | * | 2/1996 | Wilson et al. | 318/368 |
| 5,504,402 A | * | 4/1996 | Menegoli | 318/377 |
| 5,691,967 A | * | 11/1997 | Ando | 369/50 |

FOREIGN PATENT DOCUMENTS

| | | |
|---|---|---|
| EP | 0 224 378 A3 | 11/1985 |
| EP | 0 301 737 A2 | 7/1987 |
| EP | 0 322 177 A2 | 12/1987 |
| FR | 2 746 951 A1 | 3/1996 |

* cited by examiner

*Primary Examiner*—Anthony Wysocki
(74) *Attorney, Agent, or Firm*—W. Daniel Swayze, Jr.; W. James Brady; Frederick J. Telecky, Jr.

(57) ABSTRACT

A circuit (10) for braking a polyphase dc motor (12) includes a circuit (38) for producing an output signal indicating that the motor has slowed at least to an actual rotational speed and a braking circuit (42–44, 26–28) to brake the motor (12) when the output signal indicates that the motor has slowed at least to an actual rotational speed. The circuit (38) for producing an output signal indicating that the motor (12) has slowed at least to an actual rotational speed includes a first counter (70) for counting pulses of a speed signal, which may be a standard tach signal. The first counter (70) produces a first output when the first counter (70) reaches a first predetermined pulse count. A second counter (72) counts clock pulses from a clock generator (48) to produce a second output when the second counter (72) reaches a second predetermined pulse count. The first output is connected to restart the first (70) and second (72) counters, and the second output provides an indication when the frequency of the speed signal is lower than a desired ratio to the clock pulse frequency.

21 Claims, 2 Drawing Sheets

METHOD AND APPARATUS FOR BRAKING A POLYPHASE DC MOTOR

This amendment claims priority under 35 USC§ 119(e)(1) of provisional application number 60/033,760, filed Jan. 15, 1997.

BACKGROUND OF THE INVENTION

1. Field of the Invention

This invention relates to improvements in methods and apparatuses for use in conjunction with polyphase dc motors of the type used in spinning hard disk drives, or the like, and more particularly to improvements and methods for use in braking such motors.

2. Relevant Background

In the operation of hard disk drives, for example, in computer applications, certain protocols are often employed to control the braking of the motor which spins the disk drive. In usual operation, a hard disk drive has one or more heads, which record and detect magnetic fields onto a recording media on the rotating disks of the disk drive. The heads are positionable to precise radial locations by a "voice coil motor", which controls the movement of arms on which the heads are carried. When the disk is at rest, the heads normally ride just resting on the disk; however, when the disk is spinning, air forces generated between the disk and the heads cause the heads to float a small distance above the magnetic media.

Thus, when the disk drive is stopped, the air force also stops, allowing the heads to fall into contact with the magnetic media. If the heads come into contact with the media while there is still some movement of the media, wear or damage may result, both to the recorded area on the media and to the heads. Consequently, means have been proposed to position the heads over a "landing strip" portion of the disk, so that only that strip is damaged by a head falling onto the disk. Nevertheless, it will be appreciated that repeated contact between the disk and head will eventually wear upon the head, as well. Some manufactures, in fact, recommend that a computer not be powered down to avoid the type of damage that such contact causes.

Once the heads are in place and the disk drive is powered down, it is sometimes possible for the head mechanism, which is now in contact with the disk media, to move if the computer is moved, for example, as would be anticipated in portable or laptop type computers. Consequently, some manufacturers also provide for a locking mechanism, usually mechanical in construction, to hold the heads in a landed position over the landing strip. Some types of such locking mechanisms require an extra bit of electrical energy, just as the head reaches the landing position to overcome the mechanical restraint to bring the heads into their locked position.

In the event of a loss of power, to prevent the heads from landing on portions of the magnetic media other than the designated landing pad, often when a power failure is detected, the motor spinning the motor is allowed to continue spin under the inertia of the various masses of the drive. As a result, the motor coils generate their own counter- or back-emf. The coils of the spinning motor are then connected to deliver the voltages generated by the counter-emf produced in the motor windings to operate the circuitry and to provide the energy to the voice coils necessary to drive the heads to the landing strip.

Once the heads are positioned over the landing strip, the motor is then braked to stop its rotation as rapidly as possible, so that the time in which the head may contact the disk is minimized. Such braking, of course, requires additional energy. It can therefore be seen that design considerations need to be implemented to insure that a sufficient amount of energy is generated to move the heads completely to the landing strip, including the locking position, if necessary, to avoid a premature landing on an unwanted portion of the disk media. During this landing period, sufficient rotational speed of the motor must be provided to ensure a sufficient air flow to maintain the vertical position of the heads over the disk media.

However, once the heads are properly positioned, the motor must be rapidly stopped during an optimal rotational speed of the disk. This is ordinarily done by grounding sets of the driver transistors (or connecting them to a particular potential, such as $V_{cc}$). This causes the magnetic fields generated in the motor windings by the free-spinning rotor to resist its rotation, which rapidly brings the disk to a stop. However, if the disk is stopped too soon, the heads may not reach their landing strip position, which may result in undue skidding of the heads on the surface of the disk. On the other hand, if the driver transistors are shorted while the motor is still spinning too rapidly, excessive currents can be generated in the driver transistors, which may burn them out.

In the past, the motor speed was only estimated, using an RC circuit in which the capacitor of the circuit began its discharge upon loss of power, and which activated a braking circuit when the charge on the capacitor reached a predetermined discharged value. It can be appreciated, however, that such RC circuit was insensitive to the actual speed of the disk, the inertial momentum of the disk parts, the speed variations caused by aging of the disk drive parts, including aging of the RC parts themselves, and other such factors. Such RC circuits, therefore, needed to be custom designed for each different disk drive with which they were associated, and even then, the RC circuits only estimated when the disk velocities were was reduced to that at which braking should occur.

What is needed, therefore, is a method and apparatus for braking a polyphase dc motor used to spin a disk of a hard disk drive, or the like, controllably at a time when its rotational speed is within an actual and determinable range.

SUMMARY OF THE INVENTION

In light of the above, therefore it is an object of the invention to provide a method and apparatus for braking a polyphase dc motor used to spin a disk of a hard disk drive, or the like, controllably at a time when its rotational speed is within an actual and determinable range.

This and other objects, features and advantages of the invention will be apparent to those skilled in the art from the following detailed description of the invention, when read in conjunction with the accompanying drawings and appended claims.

According to a broad aspect of this invention, a circuit is provided for braking a polyphase dc motor. The circuit includes a circuit for producing an output signal indicating that the motor has slowed at least to an actual rotational speed and a braking circuit to brake the motor when the output signal indicates that the motor has slowed at least to an actual rotational speed. The circuit for producing an output signal indicating that the motor has slowed at least to an actual rotational speed and the braking circuit may be powered by a back-emf generated by the motor when power is disconnected from the motor.

The circuit for producing an output signal indicating hat the motor has slowed at least to an actual rotational speed may include a circuit for comparing a frequency of a speed signal with a clock pulse frequency. This comparing circuit may include a first counter for counting pulses of the speed signal. The first counter produces a first output when the first counter reaches a first predetermined pulse count. A second counter counts the clock pulses. The second counter produces a second output when the second counter reaches a second predetermined pulse count. The first output is connected to restart the first and second counter, and the second output provides an indication when the frequency of the speed signal is lower than a desired ratio to the clock pulse frequency.

The braking circuit may include circuitry, such as latches, or the like, to cause driver transistors for the motor to connect coils of the motor to a predetermined constant potential, such as ground or $V_{cc}$, when the output signal provides an indication that the frequency of the speed signal is lower than the clock pulse frequency.

According to another broad aspect of the invention, a circuit is provided for braking a polyphase dc motor which includes a circuit for comparing a frequency of a speed signal with a clock pulse frequency and for producing an output signal to provide an indication when the frequency of the speed signal is lower than a desired ratio to the clock pulse frequency. A braking circuit brakes the motor when the output signal provides an indication that the frequency of the speed signal is lower than a desired ratio to the clock pulse frequency. The circuit for producing an output signal indicating that the motor has slowed at least to an actual rotational speed and the braking circuit may be powered by a back-emf generated by the motor, when power is disconnected from the motor.

The circuit for comparing a frequency of a speed signal with a clock pulse frequency may include a first counter for counting pulses of the speed signal. The first counter produces a first output when the first counter reaches a first predetermined pulse count. A second counter counts the clock pulses and produces a second output when the second counter reaches a second predetermined pulse count. The first output is connected to restart the first and second counters, and the second output provides an indication when the frequency of the speed signal is lower than the clock pulse frequency.

The braking circuit may include circuitry to cause driver transistors for the motor to connect coils of the motor to a predetermined constant potential, such as ground or $V_{cc}$, when the output signal provides an indication that the frequency of the speed signal is lower than a desired ratio to the clock pulse frequency. The driver transistors may be, for example, FET devices, and the circuitry to cause driver transistors for the motor to connect coils of the motor to a predetermined constant potential may be latches to apply a voltage to gates of the FET devices when the output signal provides an indication that the frequency of the speed signal is lower than a desired ratio to the clock pulse frequency.

According to yet another broad aspect of the invention, a method for braking a polyphase dc motor is presented. The method includes generating a speed signal indicating a spinning velocity of the motor. Upon of power that energizes the motor, the method also includes determining from the speed signal that the motor has slowed at least to an actual predetermined spinning velocity and activating a braking circuit when the motor speed has been determined to have reached the predetermined spinning velocity. The step of determining from the speed signal that the motor speed has slowed at least to an actual predetermined spinning velocity may be performed by counting pulses of the speed indicating signal, counting pulses of the clock pulses, comparing the counted speed signal pulses and the counted clock pulses, and generating a brake signal to activate the braking circuit when the predetermined limit of counted clock pulses exceed the predetermined limit of counted speed signal pulses. In comparing the number of speed indicating pulses and the number of clock pulses, the steps of counting pulses of the speed indicating signal and the clock pulses may be restarted if a number of the speed indicating pulses reaches a first predetermined number before a number of the clock pulses reaches a second predetermined number.

BRIEF DESCRIPTION OF THE DRAWINGS

A preferred embodiment of the invention is illustrated in the accompanying drawings in which.

In the various figures of the drawing, like reference numerals are used to denote like or similar parts.

DETAILED DESCRIPTION OF THE PREFERRED EMBODIMENTS

It should be noted that the process steps and structures herein described do not necessarily form a complete polyphase dc motor, hard disk drive, or driver or control circuitry therefor. It is anticipated that the present invention may be practiced in conjunction with polyphase dc motors and control circuitry currently used in the art, and only so much of the commonly practiced apparatus and process steps are included as are necessary for an understanding of the present invention.

Figure 1:
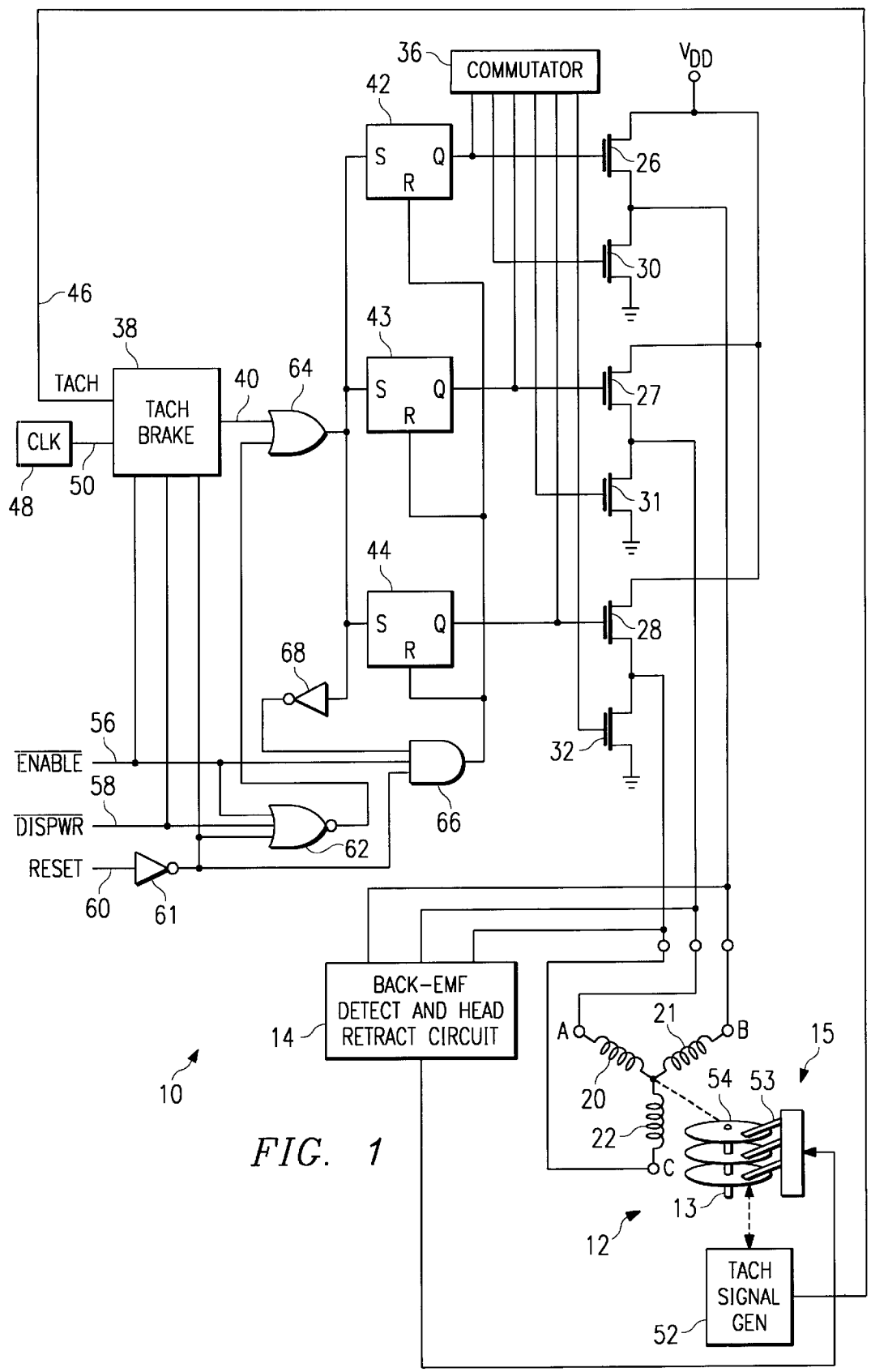
FIG. 1 is an electrical schematic diagram showing an embodiment of a breaking circuit used in conjunction with a three-phase DC motor.

With reference first to FIG. 1, an electrical schematic diagram of a brake circuit 10 in conjunction with a polyphase DC motor and, more specifically, a three-phase DC motor 12, preferably for driving the spindle 13 of a hard disk drive 15, or the like, is shown. The hard disk drive 15 may include one or more disks 54, which may contain a magnetic medium, or other medium on which data may be recorded and read by heads 53.

As known in the art, the three-phase motor 12 includes "Y" connected coils 20–22. The coils 20–22 are driven by sets of series connected drive transistors through which currents are directed to the respective coils in a sequence to produce rotation of the rotor coils (not shown) to drive the spindle 3 of the hard disk drive 15.

More specifically, high side driver transistors 26–28 are connected between a supply potential, $V_{DD}$, and a common node. Additionally, low side drivers 30–32 are connected between the respective common nodes and a reference potential, such as ground. The interconnection nodes are connected to the respective ends A, B, and C of the coils 20–22. The high and low side driver transistors 26–28 and 30–32 may be, for example, FET power transistors having gates respectively controlled by voltages supplied by a commutator circuit 36, all as known in the art.

The ends A, B, and C of the coils 20–22 are connected to a circuit 14 that detects and utilizes the power provided by the back EMF generated in the coils 20–22 in the event of a power failure to operate the power down features of the motor 12. More particularly, among other things, the back EMF generated power may be used to retract the heads 53 to a position over the landing strip area described above, and if necessary, to further move the heads to a locking position thereover. The power failure detection, back EMF utilization, and head retract circuitry are known in the art.

In accordance with a preferred embodiment of the invention, a brake circuit 10 is provided to brake the spindle 13 of the hard disk drive 15 associated with the three-phase motor 12. More particularly, a "tach brake" circuit 38 is provided that provides an appropriately timed output on line 40, below described in detail, to set S-R flip flops 42–44, the outputs of which are connected to respective high side driver transistors 26–28. When the S-R flip flops 42–44 are set, the high side driver transistors 26–28 are rendered conductive, thereby selectively connecting the ends A, B, and C of the coils 20–22 to the Supply voltage, $V_{DD}$, to brake the motor, and more specifically, to stop the spindle 13 of the hard disk drive 15.

It should be noted that although the high side drivers are shown to be connected to the supply voltage, $V_{DD}$, by the S-R flip flops 42–44 to brake the motor 12, alternatively the output from the flip flops 42–44 may be equally advantageously connected to the gates of the low side drivers 30–32 to force them into conduction to connect the ends A, B, and C of the stator coils 20, 22, and 24 to ground to brake the hard disk drive 15.

The tach brake circuit 38 serves to compare a tach signal on input line 46 with a clock signal from a clock generator 48 on line 50. The tach signal on line 46 is derived from a tach signal generator 52, which detects the rotational speed of the disks 54 of the hard disk drive 15, in known manner, and produces a series of pulses of frequency directly related to such rotational speed.

In addition to the tach and clock signals, the tach brake circuit 38 receives an enable signal, $\overline{enable}$ on line 56 a software generated signal, $\overline{DISPWR}$ on line 58, and a reset signal from line 60. The reset signal on line 60 is inverted by an inverter 61 to correspond in direction to the $\overline{enable}$ and $\overline{DISPWR}$ described above.

The brake circuit 10, as mentioned, allows for a software brake signal $\overline{DISPWR}$ to be applied to the S-R flip flops 42–44. This is accomplished via a NOR gate 62, which produces an output that may be applied to the set terminals of the S-R flip flops 42–44 via an OR gate 64. The output line 40 from the tach brake circuitry 38 is also applied to the OR gate 64, whereby either software brake or tach brake circuitry output will result in the S-R flip flops 42–44 being set to brake the motor 12.

The S-R flip flops 42–44 are reset by the reset signal on line 60 via AND gate 66, provided that the enable signal 56 is low (i.e., $\overline{enable}$ is high) and the output of the OR gate 64 is low (being inverted by an inverter 68). The reset signal 60 may be generated, for example, on power-up of the motor 12 and its associated driver circuitry.

Figure 2:
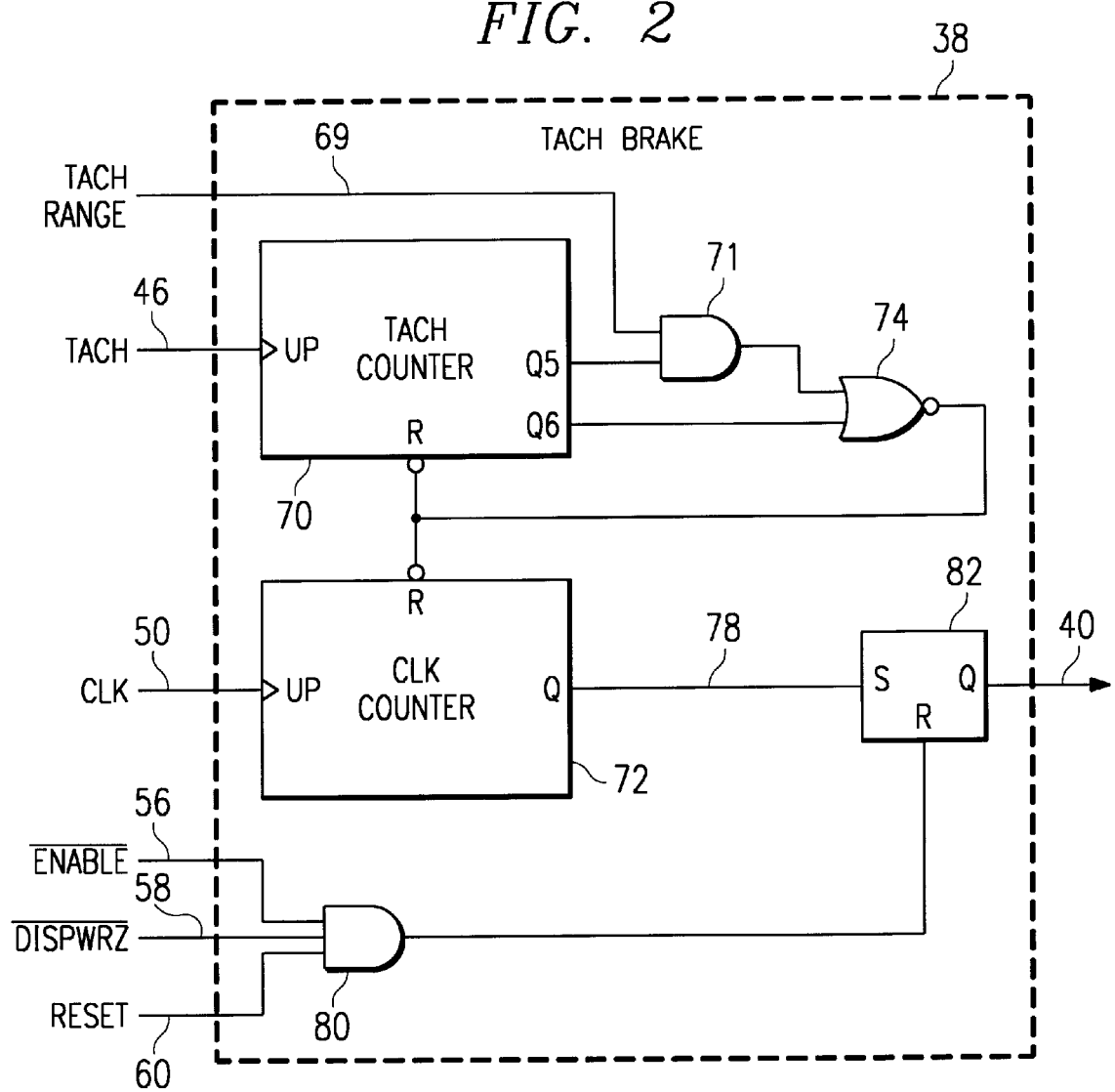
FIG. 2 is an electrical schematic diagram of the braking circuit of FIG. 1.

With reference additionally now to FIG. 2, the details of the tach brake circuit 38 are shown. The tach brake circuit 38 serves to provide an brake output signal on line 40 which goes high to brake the motor 12, as above described. The tach brake circuit 38 includes two counters 70 and 72. The counter 70 is referred to as the "tach counter", which receives the tach signals on line 46 to an "up" input, thereby incrementing the count held by the counter 70 upon the receipt of each tach pulse on line 46.

The other counter 72 is referred to as the "CLK counter", which receives the pulses from the clock generator 48 on line 50 at its up count producing input. Both the tach counter 70 and CLK counter 72 are reset by a predetermined count of the tach counter 70 in combination with a tach reset signal on line 69. In the embodiment illustrated, for example, the outputs Q5 of the tach counter 70 and the tach range signal on line 69 are connected to one input of a NOR gate 74 via AND gate 71. The Q6 output of the tach counter 70 is connected to a second input of the NOR gate 74. The output of the NOR gate 74 is connected to reset both the tach counter 70 and CLK counter 72 when the count reaches a selected number of tach pulse transitions. The tach range signal on line 69 selects a predetermined number of pulse transitions; for example, in the embodiment illustrated, if the tach range signal is high, 32 pulse transitions are selected, and if the tach range signal is low, 64 pulse transitions are selected.

The CLK counter 72, on the other hand, is designed to produce an output transition at a preprogrammed CLK count less than the selected tach range. It will be appreciated that the frequency of the clock pulses produced by the clock generator 48 and the preprogrammed CLK count will determine the rate at which the CLK counter 72 reaches a count at which an output is produced at the Q output on line 78. The clock frequency and preprogrammed CLK count should therefore be selected to enable the CLK counter 72 to reach a count at which an output is produced on the output line 78 when the tach counter reaches its predetermined output pulse timing that corresponds to the desired speed of the spindle 13 at which braking is desired.

The tach brake circuit 38 additionally receives the $\overline{enable}$, software initiated brake signal $\overline{DISPWR}$, and reset signal, respectively, on lines 56, 58, and 60 and directs them to the inputs of an AND gate 80. The output from the AND gate 80 is connected to reset an S-R flip flop 82 to control the output from the tach brake circuit 38 on line 40.

Thus, in operation, in the event of loss of power which energizes the motor 15, such as a power failure, turning off the power, or the like, the spindle 13 of the motor 15 slows. As the spindle 13 slows, a fewer number of pulses are delivered on the tach line 46 to the tach counter 70. If the count of the CLK counter 72, which counts clock pulses of constant frequency on line 50, reaches its count before being reset by the output from the tach counter 70, then the spindle 13 of the motor 12 is at slow enough velocity to permit the motor to be braked.

It can therefore be seen that since the actual velocity of the disk is known and determined at the time of braking of the motor, by virtue of the count of the tack counter 70 reaching a predetermined count relative to a known count of the CLK counter 72, the braking of the motor will be neither prematurely nor postmaturely actuated. This assures, on the one hand, that sufficient energy is generated to land the heads properly. This also assures, on the other hand, that when the disk has reached a predetermined low velocity, the motor is rapidly braked, minimizing the time of any frictional contact between the disk and heads, and assuring that any currents that are generated by the back-emf of the motor coils is not sufficient to damage the driver transistors.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for braking a polyphase dc motor, comprising:

generating a speed signal indicating a spinning velocity of the motor;

upon a loss of power that energizes the motor, determining from the speed signal that the motor has slowed at least to an actual predetermined spinning velocity;

and activating a tach braking circuit to brake the motor by using clock pulses when the motor speed has been determined to have reached said predetermined spinning velocity.

2. The method of claim 1 wherein said step of determining from the speed signal that the motor speed has slowed at least to an actual predetermined spinning velocity comprises:

counting pulses of said speed indicating signal;

counting pulses of said clock pulses;

comparing said counted speed signal pulses and said counted clock pulses;

and generating a digital brake signal to activate said braking circuit when said counted clock pulses exceed said counted speed signal pulses.

3. The method of claim 2 further comprising restarting said counting pulses of said speed indicating signal and said counting pulses of said clock pulses if a number of said speed indicating pulses reaches a first predetermined number before a number of said clock pulses reaches a second predetermined number.

4. The method of claim 1 wherein said step of activating a braking circuit when the motor speed has been determined to have reached said predetermined spinning velocity comprises:

causing driver transistors for said motor to connect coils of said motor to a predetermined constant potential.

5. The method of claim 4 wherein said step of causing driver transistors for said motor to connect coils of said motor to a predetermined constant potential comprises causing driver transistors for said motor to connect coils of said motor to ground.

6. The method of claim 4 wherein said step of causing driver transistors for said motor to connect coils of said motor to a predetermined constant potential comprises causing driver transistors for said motor to connect coils of said motor to a supply voltage.

7. A circuit from braking a polyphase dc motor, comprising:

a circuit for producing an output signal indicating that said motor has slowed at least to an actual rotational speed;

and a tach braking circuit to brake said motor by using clock pulses when said output signal indicates that said motor has slowed at least to an actual rotational speed.

8. The circuit of claim 7 wherein said circuit for producing an output signal indicating that said motor has slowed at least to an actual rotational speed and said braking circuit are powered by a back-emf generated by said motor when power is disconnected.

9. The circuit of claim 7 wherein said circuit for producing an output signal indicating that said motor has slowed at least to an actual rotational speed comprises a circuit for comparing a frequency of a speed signal with a clock pulse frequency.

10. The circuit of claim 9 wherein said circuit for comparing a frequency of a speed signal with a clock pulse frequency comprises:

a first counter for counting pulses of said speed signal, said first counter producing a first output when said first counter reaches a first predetermined pulse count;

a second counter for counting said clock pulses, said second counter producing a second output when said second counter reaches a second predetermined pulse count;

said first output being connected to restart said first and second counters, and said second output providing an indication when said frequency of said speed signal is lower than a desired ratio to said clock pulse frequency.

11. The circuit of claim 7 wherein said braking circuit comprises circuitry to cause driver transistors for said motor to connect coils of said motor to a predetermined constant potential when said output signal provides an indication that said frequency of said speed signal is lower than said clock pulse frequency.

12. The circuit of claim 11 wherein said circuitry to cause driver transistors for said motor to connect coils of said motor to a predetermined constant potential comprises circuitry to cause driver transistors for said motor to connect coils of said motor to ground.

13. The circuit of claim 11 wherein said circuitry to cause driver transistors for said motor to connect coils of said motor to a predetermined constant potential comprises circuitry to cause driver transistors for said motor to connect coils of said motor to a supply voltage.

14. The circuit of claim 11 wherein said driver transistors are FET devices, and wherein said circuitry to cause driver transistors for said motor to connect coils of said motor to a predetermined constant potential comprises latches to apply a voltage to gates of said FET devices when said output signal provides an indication that said frequency of said speed signal is lower than a desired ratio to said clock pulse frequency.

15. A circuit for braking a polyphase dc motor, comprising:

a circuit for comparing a frequency of a speed signal with a clock pulse frequency and for producing an output signal to provide an indication when said frequency of said speed signal is lower than a desired ratio to said clock pulse frequency;

and a tach braking circuit to brake said motor by using clock pulses when said output signal provides an indication that said frequency of said speed signal is lower than said clock pulse frequency.

16. The circuit of claim 15 wherein said circuit for producing an output signal indicating that said motor has slowed at least to an actual rotational speed and said tach braking circuit are powered by a back-emf generated by said motor, when power is disconnected.

17. The circuit of claim 15 wherein said circuit for comparing a frequency of a speed signal with a clock pulse frequency comprises:

a first counter for counting pulses of said speed signal, said first counter producing a first output when said first counter reaches a first predetermined pulse count;

a second counter for counting said clock pulses, said second counter producing a second output when said second counter reaches a second predetermined pulse count;

said first output being connected to restart said first and second counters, and said second output providing an indication when said frequency of said speed signal is lower than a desired ratio to said clock pulse frequency.

18. The circuit of claim 15 wherein said tach braking circuit comprises circuitry to cause driver transistors for said motor to connect coils of said motor to a predetermined constant potential when said output signal provides an indication that said frequency of said speed signal is lower than a desired ratio to said clock pulse frequency.

19. The circuit of claim 18 wherein said circuitry to cause driver transistors for said motor to connect coils of said motor to a predetermined constant potential comprises circuitry to cause driver transistors for said motor to connect coils of said motor to ground.

20. The circuit of claim 18 wherein said circuitry to cause driver transistors for said motor to connect coils of said motor to a predetermined constant potential comprises circuitry to cause driver transistors for said motor to connect coils of said motor to a supply voltage.

21. The circuit of claim 18 wherein said driver transistors are FET devices, and wherein said circuitry to cause driver transistors for said motor to connect coils of said motor to a predetermined constant potential comprises latches to apply a voltage to gates of said FET devices when said output signal provides an indication that said frequency of said speed signal is lower than a desired ratio to said clock pulse frequency.

* * * * *